ent.

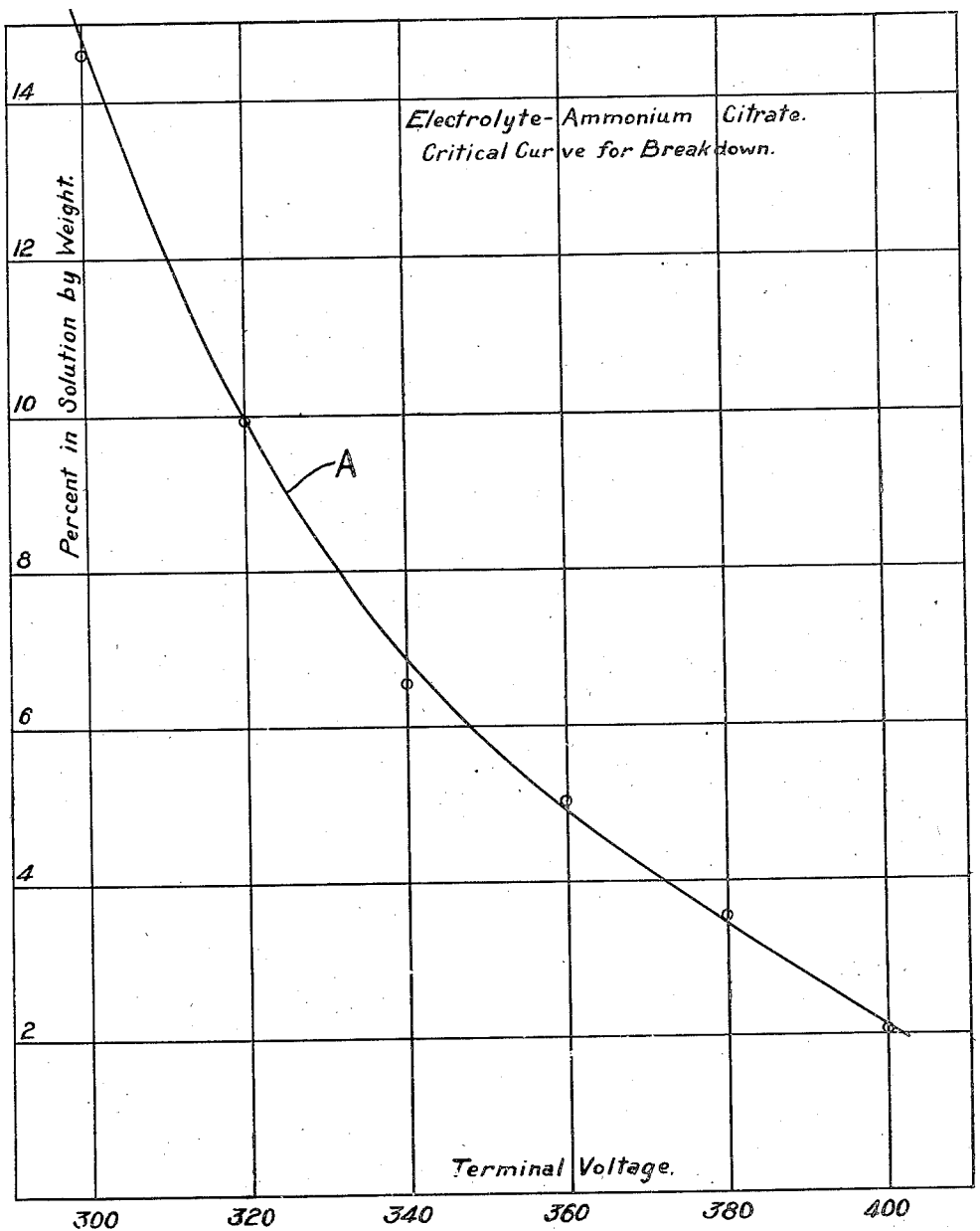

UNITED STATES PATENT OFFICE.

JOHN COULSON, OF WILKINSBURG, PENNSYLVANIA, ASSIGNOR TO WESTINGHOUSE ELECTRIC AND MANUFACTURING COMPANY, A CORPORATION OF PENNSYLVANIA.

FILM-FORMING ELECTROLYTE.

1,266,557.  Specification of Letters Patent.  Patented May 21, 1918.

Application filed May 3, 1916. Serial No. 95,112.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in Film-Forming Electrolytes, of which the following is a specification.

My invention relates to electrolytes for use in electrolytic cells, such as lightning arresters, condensers, rectifiers and the like, and it has for its object to provide an electrolyte which shall be capable of acting upon film-forming metals to produce dielectric films of great endurance under severe operating conditions and which shall also operate to remove impurities from bodies of aluminum or other film-forming metal immersed therein.

The single figure of the accompanying drawing is a diagram illustrating the relation between percentage concentration and the applied voltage in an electrolytic cell involving my invention.

In the preparation and use of condenser plates and similar conductors coated with asymmetric conducting films, it has been found that a considerable number of substances are more or less suitable for use as the solute of the electrolyte. The electrolytes heretofore employed, however, have not been able to maintain the necessary films when the plates are subjected to potentials of considerable magnitude over long periods of time.

I have discovered that certain substances, when employed in particular proportions in film-forming electrolytes, produce films having remarkable and unexpected durability, and that plates immersed in such electrolytes are of remarkably high capacitance and may be continuously operated in condensers, lightning arresters and the like for periods of time which are apparently limited only by the destructive effects of impurities in the plates.

The electrolytes which I have found to possess the foregoing valuable properties consist of aqueous solutions containing relatively small amounts of ammonium radicals and citric acid radicals, to which boric acid radicals may also be added, if desired. Such electrolytes may, for example, consist of a solution of one of the ammonium citrates, either the normal ammonium citrate, the di-ammonium hydrogen citrate, the di-hydrogen ammonium citrate, or mixtures of these compounds, and the proper concentration of these electrolytes is a function of the voltage to which the apparatus is to be subjected.

My invention is particularly advantageous for work at voltages of considerable magnitude, such, for example, as 400 volts or over, for which use the concentration of the electrolyte should be not greater than 2%, and may, with advantage, be considerably less than this strength. My investigations have shown that the proper degree of concentration for these electrolytes varies with the impressed voltage in a definite manner and may be indicated by the expression $P = ae^{kv}$ where $P$ = the percentage concentration, $v$ = the root mean square value of the alternating current voltage to be impressed, $e$ = the base of the natural system of logarithms, expressed numerically as approximately 2.72, and $a$ and $k$ are constants dependent upon the constituents of the cell. I have determined, by means of many experiments performed with electrolytic condensers, that the approximate value of the constant $a$ is 3310 and that the approximate value of the constant $k$ is $-0.0181$. The numerical expression for the equation $P = ae^{kv}$ is therefore $P = 3310 \times 2.72^{(-0.0181v)}$, from which $P$, the proper percentage concentration, may be readily computed for any voltage.

Thus in the accompanying drawing, the ordinates of the curve A represent different percentages of dissolved material and the corresponding abscissæ represent the corresponding voltages at which an electrolytic cell having the most desirable electrical characteristics may be obtained. By "electrical characteristics" I means low power-factor and strong, rapidly reforming film. It will be noted that the higher the applied voltage, the weaker should be the solution or, in other words, the strength of the solution bears an inverse relation to the applied voltage.

Among the advantages to be derived from the use of weak solutions are the following. With strong solutions of ammonium citrate, such, for example, as 10% or over, there is a marked tendency for the salt to precipitate on the plates or adjacent thereto, causing weak spots in the film. In like manner, with strong solutions, crystallization takes place at the surface of the electrolyte where the plates emerge therefrom, causing complete destruction of the film at this point and a more or less vigorous attack on the metal of the plates, together with decomposition of the electrolyte.

With a strong solution, there is an excess of active principle, namely, ammonium citrate, per unit volume, over what may be ionized. This excess has a tendency to form with the filming material (aluminum hydroxid) complex ammonium-aluminum citrates, which have marked deleterious effects upon the electrical characteristics of the cell. For most desirable operation, the electrolyte should have only that degree of concentration which supplies the maximum possible number of ions per unit volume, without excess material. This point is determined for the different voltages substantially in accordance with the accompanying diagram.

The weaker the solution employed, the less marked is the tendency toward fungus growths and, furthermore, the effect of temperature changes upon the electrical characteristics of a cell having a weak solution are less than those of a similar cell having a strong solution.

The percentage effect of a definite amount of evaporization upon the strength of the electrolyte is less with a weak electrolyte than with a strong electrolyte. Thus a cell subject to evaporization requires less attention if supplied with a weak electrolyte than if supplied with a strong electrolyte.

A cell containing a weak electrolyte may be operated at a higher voltage or, in other words, has greater capacity per unit volume, thus saving weight, cost and space in the production of a given capacity effect.

With electrolytes of low concentration, a break-down takes the form of a short, sharp spark which is immediately extinguished. Apparently, the film is not totally destroyed as it is immediately reëstablished at full strength. On the other hand, with a strong solution, a break-down assumes more of the characteristics of an arc, being more or less sustained in nature, violently agitating the electrolyte and destroying the film to its very base, so that fresh metal is exposed. Under these conditions, it is difficult to reëstablish the film at its maximum value without again treating the plate to build up the film.

If desired, the foregoing electrolytes may be varied by the addition of a small amount, ¼ of 1%, for example, of one of the ammonium borates which, by increasing the relative concentration of the ammonium radicals present, improves the power factor of the electrolytic apparatus and raises the limiting or breakdown voltage.

The efficiency of filmed conductors of the class to which my present invention relates is measured by the power factor of the apparatus composed of such plates. I have found that filmed plates immersed in the electrolytes mentioned above exhibit remarkable variations in power factor in proportion to the concentration of the solutions and that, at voltages of the order of 400 volts, as stated above, concentrations below 2% give excellent results, while greater concentrations are relatively useless, so far as continuous operation of the plates is concerned. When the electrolyte is of the necessary low concentration, the plates may be operated indefinitely with substantially no change in power factor or capacitance.

I am aware that ammonium citrate has heretofore been proposed for use in electrolytic cells, but, in high concentrations, 10% or more, that are entirely useless for my present purpose, which is particularly concerned with apparatus that is operable at relatively high impressed voltages.

The term "dilute solution," as used in the subjoined claims, refers to a solution containing substantially less than 10% of dissolved material. It is to be understood, however, that, within the range specified, the concentration of the electrolytes may be varied in accordance with particular conditions or convenience and that, therefore, no limitations are to be imposed upon my invention except such as are indicated in the appended claims.

I claim as my invention:

1. An electrolyte comprising an aqueous solution of less than 10% concentration and containing citric acid radicals and ammonium radicals.

2. An electrolyte comprising an aqueous solution of not materially over 2% concentration and containing citric acid radicals and ammonium radicals.

3. An electrolyte comprising an aqueous solution of less than 10% concentration and containing citric acid radicals, ammonium radicals and radicals of a boric acid.

4. An electrolyte comprising an aqueous solution of not materially over 2% concentration and containing citric acid radicals, ammonium radicals and radicals of a boric acid.

5. An electrolyte comprising a solution of citric acid of less than 10% concentration and containing a small amount of ammonium borate.

6. An electrolyte comprising a solution of citric acid containing not materially over 2% of citric acid and a small amount of ammonium borate.

7. An electrolyte containing not materially over 2% of a plurality of ammonium citrates.

8. An electrolyte containing a solution of an ammonium citrate of less than 10% concentration.

9. An electrolyte containing not materially over 2% of an ammonium citrate.

10. An electrolyte containing not materially over 2% of citric acid and about ¼% of ammonium borate.

11. An electrolyte containing citric acid radicals and ammonium radicals, the concentration of the solution being substantially expressed by the equation $P = 3310 \times 2.72^{(-0.0181v)}$, where P equals the percentage concentration of the electrolyte and $v$ equals the voltage under which the electrolyte is to be used.

12. The method of adapting a film-forming electrolytic cell to resist various terminal voltages which comprises decreasing the content of solute in the electrolyte thereof with an increase of applied voltage and vice versa.

13. The method of adapting a film-forming electrolytic cell to best resist various terminal voltages which comprises so decreasing the percentage content of solute with each voltage increment as to produce a film of maximum strength and correspondingly increasing the percentage content of solute with each voltage decrement.

In testimony whereof, I have hereunto subscribed my name this 14th day of April, 1916.

JOHN COULSON.